Sept. 13, 1960     H. H. ANDERSON     2,952,274
MULTIPORT VALVE
Filed Jan. 21, 1954
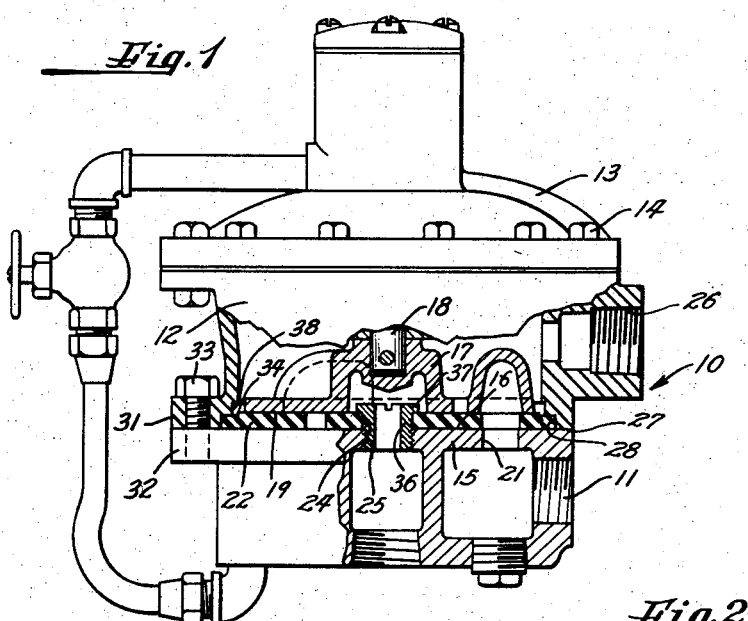
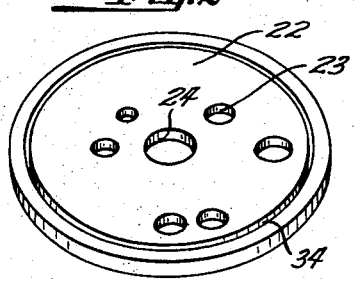
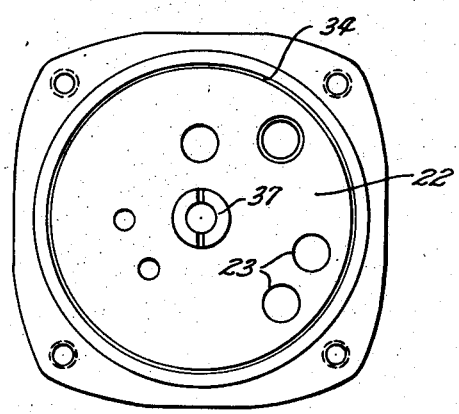
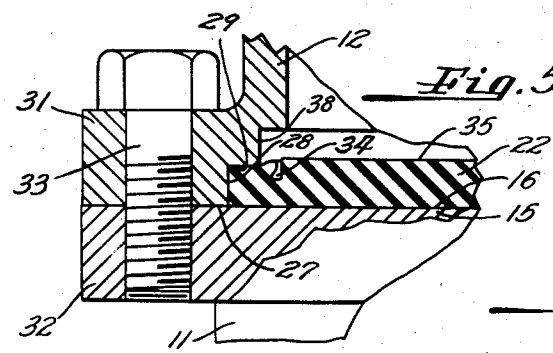
Inventor
Hjalmer H. Anderson
By McCanna and Morsbach
Attys.

United States Patent Office 2,952,274
Patented Sept. 13, 1960

2,952,274

MULTIPORT VALVE

Hjalmer H. Anderson, Rockford, Ill., assignor to Aquamatic, Inc., a corporation of Illinois Filed Jan. 21, 1954, Ser. No. 405,324

4 Claims. (Cl. 137—625.21)

This invention relates to a multiport valve of the rotary plate type and more particularly pertains to a valve having a novel gasket structure arranged to form a seat for the rotor and also seal the space between the stator and the valve casing.

The primary object of this invention is the provision of a multiport plate type valve having an improved valve gasket for sealing the interface between the stator and the rotor in an improved manner to prevent leakage between the several ports in the stator.

Another object of this invention is the provision of a multiport valve of the rotary plate type having an improved gasket wherein a unitary resilient gasket member overlies the stator and provides a seat for the valve rotor and is so arranged that the surface of the gasket member on which the rotor seats is undistorted when the periphery of the gasket member is clamped to the stator to prevent curling of the gasket member.

A further object of this invention is the provision of an improved gasket member for a multiport rotary plate type valve which may be economically formed and easily installed or replaced on the valve stator.

These, together with various ancillary objects and advantages of this invention will be more readily appreciated as the same becomes better understood by reference to the following detailed description when taken in connection with the accompanying drawings wherein:

Figure 1 is a side elevational view of a multiport rotary plate type valve embodying the improved gasket member, parts being broken away and shown in section to illustrate details of construction;

Fig. 2 is a perspective view of the gasket member;

Fig. 3 is a top plan view of the gasket member shown mounted on the stator;

Fig. 4 is a fragmentary sectional view through the gasket member; and

Fig. 5 is an enlarged fragmentary sectional view through the multiport valve and gasket member.

Multiport valves of the type disclosed in the present application are adapted for a variety of purposes. While the valve has been particularly designed for controlling the various flows to and from a water treating apparatus, it is to be understood that its use is not so limited.

The multiport valve in general comprises a valve casing 10 including a lower valve body 11 and an upper valve body 12 having a cover member 13 secured thereto as by bolts 14. The lower valve body 11 has a ported valve face or stator 15 secured thereto, or formed integrally therewith as illustrated in the drawings and having a flat upper surface 16. A rotor or distributor 17 having a plurality of passages and ports formed therein is rotatably mounted in the upper body member 12 on a shaft 18, the distributor having a flat face 19 adapted to seat on the stator 15. The distributor 17 is adapted to be rotated about the axis of the shaft 18 into different rotational positions to establish the various flows through the ports 21 in the stator, and preferably the multiport valve is of the lift turn type wherein the distributor is lifted, turned to the next rotational position and then reseated upon the stator. The lifting, turning and reseating of the distributor on the stator may be achieved in any desired manner as by an hydraulically actuated operating mechanism in which the valve distributor is raised and reseated on the stator by the application of hydraulic pressure to a diaphragm (not shown) connected to the stem 18, and the stem and distributor turned in response to raising and lowering of the distributor. Alternatively, a manually operated mechanism may be provided. Since the specific apparatus for turning the distributor to its various rotational positions forms no part of the present invention and may be of any conventional construction, further illustration or description thereof is not deemed necessary for an understanding of the invention.

In valves of this type employing a large plate for the distributor, accurate mating surfaces must be provided between the distributor and the stator in order to prevent the leakage of fluid between the several ports in the stator and also between the distributor and the upper valve body. For this purpose, a gasket 22 formed of resilient material such as rubber or the like is mounted upon the upper face 16 of the stator 15. The gasket 22 is provided with a plurality of circumferentially spaced ports 23 which register with the corresponding ports 21 in the stator, a central aperture 24 being provided to register with the central opening 25 in the stator. The valve is preferably arranged so that when the distributor is seated upon the gasket member 22, pressure is applied to the upper face of the distributor to effect a fluid tight seal between the distributor and the gasket member. In this apparatus the pressure is applied from an hydraulic line through hte passage 26 to the upper face of the distributor whereby a uniform pressure is applied across the entire face of the distributor to effect seating thereof. The gasket 22, which is preferably attached to the surface 16 of the stator by a suitable adhesive, may tend to curl upwardly at the periphery thereof and, for this reason, means is provided for clamping the periphery of the gasket member to the stator.

The upper valve body 12 is provided with a lower edge 27 which is adapted to register with the periphery of the stator 15, which lower edge is provided with an inwardly facing recess 28 along the inner edge thereof. The depth of the recess is chosen so that the shoulder 29 formed thereby is spaced from the lower edge 27 of the casing a distance less than the thickness of the gasket 22 whereby when the upper valve body is mounted on the lower valve body and attached thereto, the periphery of the gasket member 22 is clamped therebetween and thereby prevents curling of the edges of the gasket member. For reasons more fully set forth hereinafter, the edge of the gasket member 22 abuts the inwardly facing edge of the recess 28 whereby the upper valve body is accurately located with respect to the gasket member when the valve is assembled. As shown in Figs. 1 and 5, the upper and lower valve bodies are provided with a plurality of laterally projecting lugs 31 and 32 respectively, having a hole extending therethrough for the reception of a bolt or stud 33 whereby the upper and lower sections are clamped together and to the periphery of the gasket.

In accordance with the present invention, an annular recess or groove 34 is provided in the upper surface of the gasket member and is located between the inner periphery of the upper valve body and the outer periphery of the distributor 17. The annular recess in the upper surface of the gasket is provided to accommodate the portion of the gasket member which is deformed due to clamping of the periphery thereof to the stator to thereby prevent distortion of the face of the gasket member inwardly of the recess therein. As is best shown in Fig. 5, when the outer portion of the gasket member is clamped to the stator, the deformation of the gasket member occurs in that portion between the annular recess 34 and the edge of the gasket so that the upper surface 35 of the gasket member which is engaged by the distributor remains undistorted. Consequently, an effective seal is provided for the distributor. The upper valve body 12 must obviously not contact the gasket member inwardly of the recess 34 therein and for this purpose the portion 38 of the inner wall of the upper valve body adjacent the shoulder 29 is shaped so as to be spaced outwardly from the periphery of the distributor 17.

The central portion of the gasket member may also be anchored to the stator and for this purpose the central opening 25 in the stator is internally threaded for the reception of a threaded ferrule 36, which ferrule has a peripheral flange 37 on the upper edge thereof adapted to engage the gasket member adjacent the central aperture 24 and thereby clamp the central portion of the gasket member to the stator.

In order to reduce the size of the valve to a minimum commensurate with the size of the ports required to provide substantially unrestricted flow, only a small clearance is provided between the inner wall of the upper valve body and the periphery of the distributor. Accurate alignment of the upper valve body with respect to the gasket is therefore essential to prevent the upper valve body from contacting the face of the gasket member inwardly of the groove 34. In the present invention, this is achieved by the edge of the gasket member which is dimensioned so as to abut the inwardly facing edge of the recess 28 on the upper valve body to thereby assure positioning of the upper valve body concentrically on the gasket member.

A multiport valve of the rotary plate type embodying the improved gasket structure is thus provided with an undistorted flat resilient seat for sealing the interface between the distributor and the stator. The annular groove 34 in the upper face of the gasket member and spaced inwardly of the periphery thereof accommodates the deformed or distorted portion of the periphery of the gasket member caused by the compression thereof when the gasket member is clamped to the stator. In the absence of such a groove, the compression of the periphery of the gasket member causes the formation of an annular ridge in the upper surface of the gasket member inwardly of the portion that is clamped to the stator. The rotor or distributor would thus tend to ride on the raised ridge so that accurate seating of the face of the rotor on the gasket member would be prevented. Under such conditions leakage may occur between the ports in the stator.

The gasket member is preferably dimensioned so that the edge thereof is spaced inwardly of the periphery of the stator and the lower edge 27 of the upper valve body arranged to seat directly on the periphery of the face of the stator when the upper valve body is clamped thereto by studs 33 so that tilting of the upper valve body relative to the face of the stator during assembly of the valve is prevented. Consequently, tilting of the rotor which is carried by the upper valve body is also prevented thereby assuring that the underface of the rotor will uniformly contact the face of the gasket. With this construction, the peripheral portion of the gasket member, which is interposed between the shoulder 29 and the stator, is uniformly compressed when the upper valve body is clamped to the stator and provides an effective seal therebetween.

I claim:

1. In a multiport valve, a valve casing including a lower valve body having a ported valve face and an upper valve body mounted on the lower body, a gasket member overlying said ported valve face and having apertures therein registering with the ports in said face, the gasket member being secured to said face in face-to-face contact to prevent cross flow between the ports along said ported face, means on the upper body member engaging the peripheral portion of the gasket member at the upper side thereof for clamping the periphery of the gasket member to the ported face, said gasket member having a continuous annular groove formed in the upper side thereof of a depth and width to receive the material displaced by clamping, spaced inwardly of the peripheral portion thereof engaged by said clamping means and in close proximity to the clamping means, whereby the gasket member inside said groove is not deformed by said clamping means, and a ported rotary distributor within the upper valve body and mounted thereon for axial movement toward and away from said lower valve body and for rotary movement between different rotative settings, said distributor having an outer diameter smaller than the diameter of said groove to seat on the upper side of the gasket member inwardly of said groove for controlling the flows through the ports in the valve face.

2. In a multiport valve, a metal valve casing including a lower valve body having a ported valve face and an upper valve body having a depending peripheral wall and a lower edge surface thereon, means for securing said upper valve body to said lower valve body with said edge surface in metal-to-metal contact with the ported face of the lower body to define a fixed assembled relationship, a gasket member overlying said ported valve face and having apertures therein registering with the ports in said valve face, the gasket being secured to said face in face-to-face contact to prevent cross flow between the ports along said ported face, said upper valve body having an inwardly opening recess formed in the lower edge portion and extending around the body defining a shoulder, said gasket member having the peripheral portion thereof interposed between said shoulder and said valve face to form a seal therebetween when the upper valve body is attached to the lower valve body, and a rotary distributor in said upper body and mounted thereon for axial movement toward and away from the lower valve body and for rotary movement between different rotative settings, said distributor being adapted to seat on said gasket and having the periphery thereof spaced inwardly from the lower edge of said upper body, said gasket having a groove formed in the upper face thereof, located between said shoulder and the periphery of said distributor to receive the material displaced by clamping of the peripheral portion of the gasket member.

3. In a multiport valve, a valve casing including a lower valve body having a ported face and an upper valve body having a lower edge adapted to be mounted on the periphery of the ported face, a gasket member overlying said ported face and having apertures therein registering with the ports of said ported face, the gasket being secured to said face in face-to-face contact to prevent cross flow between the ports along said ported face, said upper valve body having an inwardly opening recess formed in the lower edge thereof and defining a shoulder spaced inwardly from said lower edge a distance less than the thickness of said gasket member, the peripheral portion of said gasket member extending into said recess in said upper valve body, means for clamping said upper valve body to said lower valve body whereby the peripheral portion of said gasket member is compressed between said shoulder and said ported face, and a ported rotary distributor mounted on the upper valve body for axial sliding movement toward and away from the lower valve body and for rotary movement relative thereto between different rotative settings, said distributor being adapted to engage the upper side of said gasket member to control the flows of fluid therethrough and prevent cross flow between the ports, said gasket member having a groove in the upper side thereof located between said shoulder on said upper valve body and the periphery of said distributor to receive substantially all of the material displaced by clamping, whereby to prevent distortion of the portion of the gasket member engaged by said distributor and consequent non-uniform seating of the distributor on the gasket and cross flow between the ports.

4. The combination of claim 3 wherein the peripheral edge of said gasket member abuts the inwardly facing edge of said recess in said upper valve body to locate the upper valve body on said gasket member during assembly of the valve.

References Cited in the file of this patent

UNITED STATES PATENTS

| | | |
|---|---|---|
| 1,771,410 | Landas | July 29, 1930 |
| 2,153,559 | Hendricks | Apr. 11, 1939 |
| 2,211,167 | Safford | Aug. 13, 1940 |
| 2,283,439 | Herman | May 19, 1942 |
| 2,364,697 | Daniels | Dec. 12, 1944 |
| 2,684,829 | McFarland | July 27, 1954 |

FOREIGN PATENTS

| | | |
|---|---|---|
| 684,106 | France | of 1930 |